(12) United States Patent
Asada

(10) Patent No.: US 10,884,417 B2
(45) Date of Patent: Jan. 5, 2021

(54) NAVIGATION OF MOBILE ROBOTS BASED ON PASSENGER FOLLOWING

(71) Applicants:Boston Incubator Center, LLC, Waltham, MA (US); East Japan Railway Company, Saitama (JP)

(72) Inventor: Haruhiko Harry Asada, Lincoln, MA (US)

(73) Assignees: Boston Incubator Center, LLC, Lexington, MA (US); East Japan Railway Company, Saitama (JP)

( * ) Notice: Subject to any disclaimer, the term of this patent is extended or adjusted under 35 U.S.C. 154(b) by 339 days.

(21) Appl. No.: 15/806,213

(22) Filed: Nov. 7, 2017

(65) Prior Publication Data

US 2018/0129217 A1 May 10, 2018

Related U.S. Application Data

(60) Provisional application No. 62/418,662, filed on Nov. 7, 2016.

(51) Int. Cl.
*G05D 1/02* (2020.01)

(52) U.S. Cl.
CPC ......... *G05D 1/0214* (2013.01); *G05D 1/0246* (2013.01)

(58) Field of Classification Search
CPC .............. G05D 1/0214; G05D 1/0246; G05D 2201/0206; G05D 1/0212; G05D 1/0238; G05B 19/406; G05B 19/4061

USPC ............. 700/250, 255, 257, 258, 259; 901/1
See application file for complete search history.

(56) References Cited

U.S. PATENT DOCUMENTS

| 2011/0026770 | A1* | 2/2011 | Brookshire | .......... | G05D 1/0251 |
| | | | | | 382/103 |
| 2012/0316680 | A1* | 12/2012 | Olivier, III | .......... | G05D 1/0246 |
| | | | | | 700/258 |
| 2013/0342652 | A1* | 12/2013 | Kikkeri | .................... | B25J 9/104 |
| | | | | | 348/46 |

* cited by examiner

*Primary Examiner* — Bao Long T Nguyen
(74) *Attorney, Agent, or Firm* — Spano Law Group; Joseph S. Spano

(57) ABSTRACT

Methods and systems for navigating a mobile robot through a crowded pedestrian environment by selecting and following a particular pedestrian are described herein. In one aspect, a navigation model directs a mobile robot to follow a pedestrian based on the position and velocity of nearby pedestrians and the current and desired positions of the mobile robot in the service environment. The mobile robot advances toward its desired destination by following the selected pedestrian. By repeatedly sampling the positions and velocities of nearby pedestrians and the current location, the navigation model directs the mobile robot toward the endpoint location. In some examples, the mobile robot selects and follows a sequence of different pedestrians to navigate to the desired endpoint location. In a further aspect, the navigation model determines whether following a particular pedestrian will lead to a collision with another pedestrian. If so, the navigation model selects another pedestrian to follow.

19 Claims, 7 Drawing Sheets

NAVIGATION OF MOBILE ROBOTS BASED ON PASSENGER FOLLOWING

CROSS REFERENCE TO RELATED APPLICATIONS

The present application for patent claims priority under 35 U.S.C. § 119 from U.S. provisional patent application Ser. No. 62/418,662, entitled "Navigation Of Mobile Robots Based On Passenger Following," filed Nov. 7, 2016, the subject matter of which is incorporated herein by reference in its entirety.

TECHNICAL FIELD

The described embodiments relate to systems and methods for mobile robot navigation in a crowded pedestrian environment.

BACKGROUND INFORMATION

Robotic vehicles operating in a service environment such as a hospital, public transportation station, etc., are often required to operate autonomously in crowded spaces without colliding with pedestrians. A mobile robot that navigates a predefined course through a crowded pedestrian environment is likely to severely impede pedestrian traffic flow, and may lead to collisions with pedestrians. Conversely, a mobile robot that navigates through a crowded pedestrian environment by avoiding surrounding pedestrians will find it difficult, if not impossible, to successfully navigate to a desired endpoint location. For example, a mobile robot employing conventional collision avoidance algorithms may not be able to identify a collision free path because interactions among pedestrians lead to a highly dynamic pedestrian environment. In some examples, conventional collision avoidance algorithms inaccurately assume individual pedestrians move at a constant velocity. Improper navigation of a mobile robot through a crowded pedestrian environment can create a hazardous situation as the mobile robot is operating in close proximity to humans. It is especially concerning if the mobile robot is carrying heavy payloads and is capable of high acceleration maneuvers.

In summary, improvements in the design and control of wheeled, robotic vehicles are desired to improve operational safety in a crowded pedestrian environment. More specifically, a resolution to the conflicting objectives of navigating to a desired endpoint location, while avoiding significant disruption of pedestrian traffic flows is desired.

SUMMARY

Methods and systems for navigating a mobile robot through a crowded pedestrian environment by selecting and following a particular pedestrian are described herein. By selecting and following a particular pedestrian a mobile robot effectively joins a pedestrian flow.

In one aspect, a navigation model receives measurement data identifying the position and velocity of nearby pedestrians. Based on the pedestrian position and velocity information, the current and desired positions of the mobile robot in the service environment, the navigation model generates command signals that cause the mobile robot to follow one of the pedestrians, thereby joining a pedestrian flow that advances the mobile robot toward its desired destination. By repeatedly sampling the positions and velocities of nearby pedestrians and the current location, the navigation model directs the mobile robot toward the endpoint location in the service environment with a minimum of disruption to pedestrian traffic flows within the service environment. In some examples, the mobile robot selects and follows a sequence of different pedestrians to navigate to the desired endpoint location.

In a further aspect, the navigation module selects which candidate pedestrian to follow based on one or more criteria. Exemplary criteria include whether the candidate pedestrian is moving in the same or similar direction as the robot's destination, how long it will take for the mobile robot to "catch up" to the candidate pedestrian, and how quickly the pedestrian is moving compared to the desired speed of the mobile robot.

In another further aspect, the navigation model determines whether following a particular pedestrian will lead to a collision with another pedestrian. If so, the navigation model selects another candidate pedestrian to follow. As a result, a mobile robot employing the navigation model is able to follow a stream of pedestrians walking in the same or similar direction, while avoiding collisions with pedestrians moving in the opposite or different directions.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for navigating a mobile robot through a crowded pedestrian environment by selecting and following a particular pedestrian are described herein. A crowded, pedestrian environment includes significant flows of moving people (e.g., a train station, a hospital environment, an airport, etc.). Pedestrians moving in similar directions in a crowded environment tend to move as a group and form a pedestrian flow. Often, pedestrians are able to join or leave the group with minimal disturbance to the overall pedestrian flow by occupying an open space behind a pedestrian participating in the flow and closely following the pedestrian.

In one aspect, a mobile robot navigates through a crowded pedestrian environment by selecting a particular pedestrian and following the selected pedestrian; effectively joining a pedestrian flow. A navigation model receives measurement data identifying the position and velocity of each nearby pedestrian. Based on the current and desired positions of the mobile robot and pedestrian position and velocity information, the navigation model generates command signals that cause the mobile robot to follow one of the pedestrians, thereby joining a pedestrian flow that advances the mobile robot toward its desired destination. By repeatedly sampling the position and velocity of surrounding pedestrians and the current location of the mobile robot, the navigation model directs the mobile robot toward the endpoint location with a minimum of disruption to pedestrian traffic flows within the service environment. In some examples, the mobile robot selects and follows a sequence of different pedestrians to navigate to the desired endpoint location.

In a further aspect, the navigation model determines whether following a particular pedestrian will lead to a collision with another pedestrian. If so, the navigation model selects another candidate pedestrian to follow. As a result, a mobile robot employing the navigation model is able to follow a stream of pedestrians walking in the same or similar direction, rather than coping with pedestrians moving in the opposite or different directions.

Figure 1:
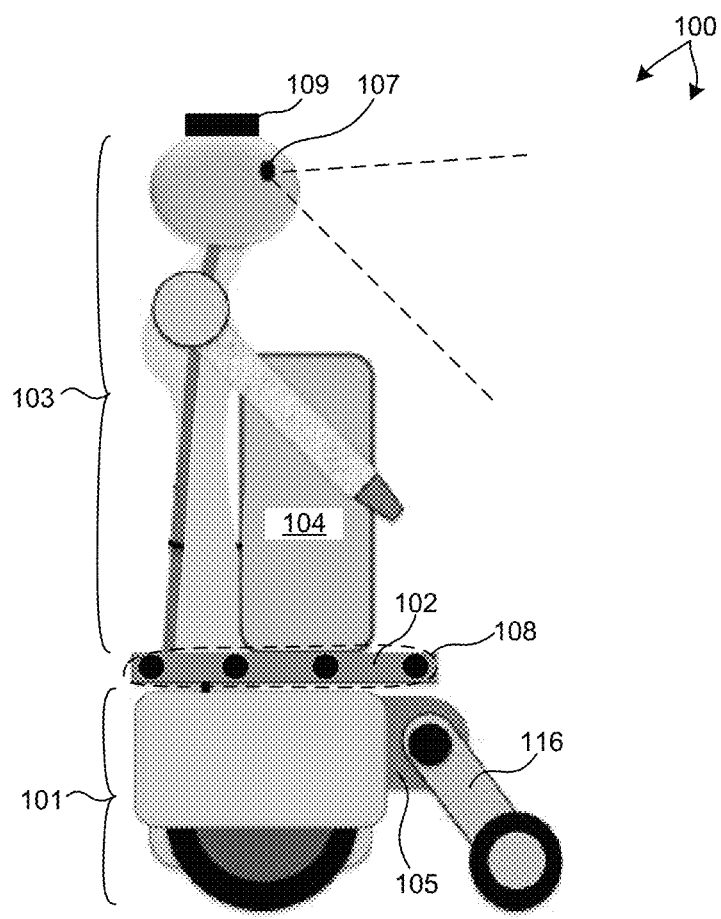
FIG. 1 is a diagram illustrative of an embodiment of a mobile robot 100 in at least one novel aspect.

FIG. 1 depicts a mobile robot 100 configured as a service robot in one embodiment. Mobile robot 100 includes a wheeled, robotic vehicle 101 with driving and steering wheels attached to a frame 105 of the vehicle 101. Mobile robot 100 also includes a payload platform 102 configured to carry a payload 104. In addition, mobile robot 100 includes an upper body robot 103 configured to secure the payload 104 to the payload platform 102 and interact with users of mobile robot 100. In one example, mobile robot 100 operates in a public transportation station (e.g., train station) and assists passengers with the transport of their luggage through the station. In another example, mobile robot 100 operates in a public area and assists the public with refuse disposal. In this example, payload 104 includes a refuse container.

Figure 2:
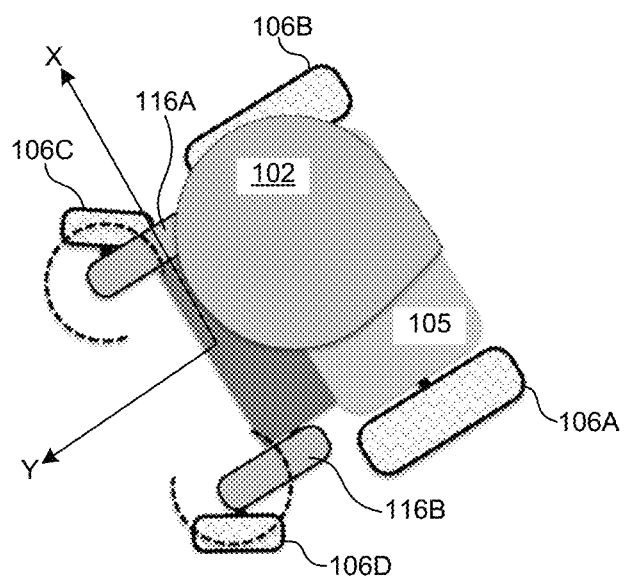
FIG. 2 depicts a top view of mobile robot 100 in one embodiment.

FIG. 2 depicts a top view of the wheeled, robotic vehicle 101 and payload platform 102 of mobile robot 100. As depicted in FIG. 2, wheeled robotic vehicle 101 includes drive wheels 106A and 106B and steering wheels 106C and 106D. In some embodiments, steering wheels 106C and 106D are passive wheels that are free to rotate about multiple axes. In these embodiments, steering wheels 106C and 106D function primarily to support the load normal to the ground surface, while the rotations of drive wheels 106A and 106B dictate the motion trajectory of the wheeled, robotic vehicle 101. In some other embodiments, the orientation of steering wheels 106C and 106D about an axis normal to the ground surface is actively controlled. In these embodiments, steering wheels 106C and 106D also function to control the direction of the motion trajectory of the wheeled, robotic vehicle 101. In some other embodiments, both the rotation of steering wheels 106C and 106D and the orientation of steering wheels 106C and 106D about an axis normal to the ground surface are actively controlled. In these embodiments, steering wheels 106C and 106D function to control both the direction of the motion trajectory and the velocity along the motion trajectory of the wheeled, robotic vehicle 101.

As depicted in FIG. 1, mobile robot 100 includes an image capture system 107, a range finding sensor system 108, and a LIDAR sensor system 109. Image capture system 107 includes one or more image capture devices (e.g., cameras, etc.) that capture images of people and objects in the vicinity of mobile robot 100. Range finding sensor system 108 includes one or more range finding sensors (e.g., laser based, sonar, radar based range finding sensors) that estimate the distance between mobile robot 100 and people or objects in the vicinity of mobile robot 100. LIDAR sensor system 109 includes one or more LIDAR devices that estimate the distance between mobile robot 100 and people and objects in the vicinity of mobile robot 100. Image data collected by image capture system 107, range data collected by range finding sensor system 108, and range data collected by LIDAR sensor system 109, or any combination, is employed to estimate the presence of pedestrians in the vicinity of mobile robot 100 and their positions and velocities relative to mobile robot 100.

Any of the image capture system, range finding sensor system, and LIDAR sensor system may be configured with any suitable field of view. In some embodiments, any of the image capture system, range finding sensor system, and LIDAR sensor system is configured to sense people and objects within a full three hundred sixty degree field of view around mobile robot 100. However, in some other embodiments, the field of view of any of the image capture system, range finding sensor system, and LIDAR sensor system may be restricted to a particular range or set of ranges of angles around mobile robot 100. The fields of view of any of the image capture system, range finding sensor system, and LIDAR sensor system may be configured to fully overlap, partially overlap, or not overlap at all. In a preferred embodiment, the fields of view of at least two sensor subsystems overlap to generate redundancy in the collected sensor data. In some examples, redundant data collection improves the identification and estimation of position and velocity of pedestrians nearby mobile robot 100.

Although mobile robot 100 depicted in FIG. 1 includes an image capture system, a range finding sensor system, and a LIDAR sensing system, in general, a mobile robot as described herein may include any combination of these systems. Similarly, a mobile robot as described herein may include any suitable arrangement of sensors employed to identify and estimate the position and velocity of pedestrians nearby mobile robot 100.

In some embodiments, mobile robot 100 includes an electronic device (not shown) suitable for locating the mobile robot 100 within a service environment in which the mobile robot 100 is confined to operate (e.g., a train station). In one embodiment, mobile robot 100 includes a radio frequency (RF) beacon that communicates with similar beacons fixedly positioned within the service environment as part of an indoor positioning system. Based on communication among these beacons, mobile robot 100 is able to locate itself within the service environment.

In some other embodiments, image data collected by image capture system 107, range data collected by range finding sensor system 108, and range data collected by LIDAR sensor system 109, or any combination, is employed to estimate the current location of the mobile robot within a service environment. In one example, image data collected by image capture system 107 includes images of fiducials fixedly mounted throughout the service environment (e.g., a train station, hospital, etc.). By performing image processing operations on the fiducial images, computing system 200 determines the location and orientation (e.g., x-position, y-position, and Rz orientation) with respect to the service environment. In one example, the fiducials and image processing software are available from April Robotics Laboratory, University of Michigan, Ann Arbor, Mich. (USA). In another example, computing system 200 assembles images from range data collected by LIDAR sensor system 109. In addition, an image map of the service environment is stored in memory on-board mobile robot 100. Computing system 200 employs a simultaneous localization and mapping (SLAM) technique to compare the assembled images with the image map of the service environment to estimate the location of mobile robot 100 within the service environment.

Figure 3:
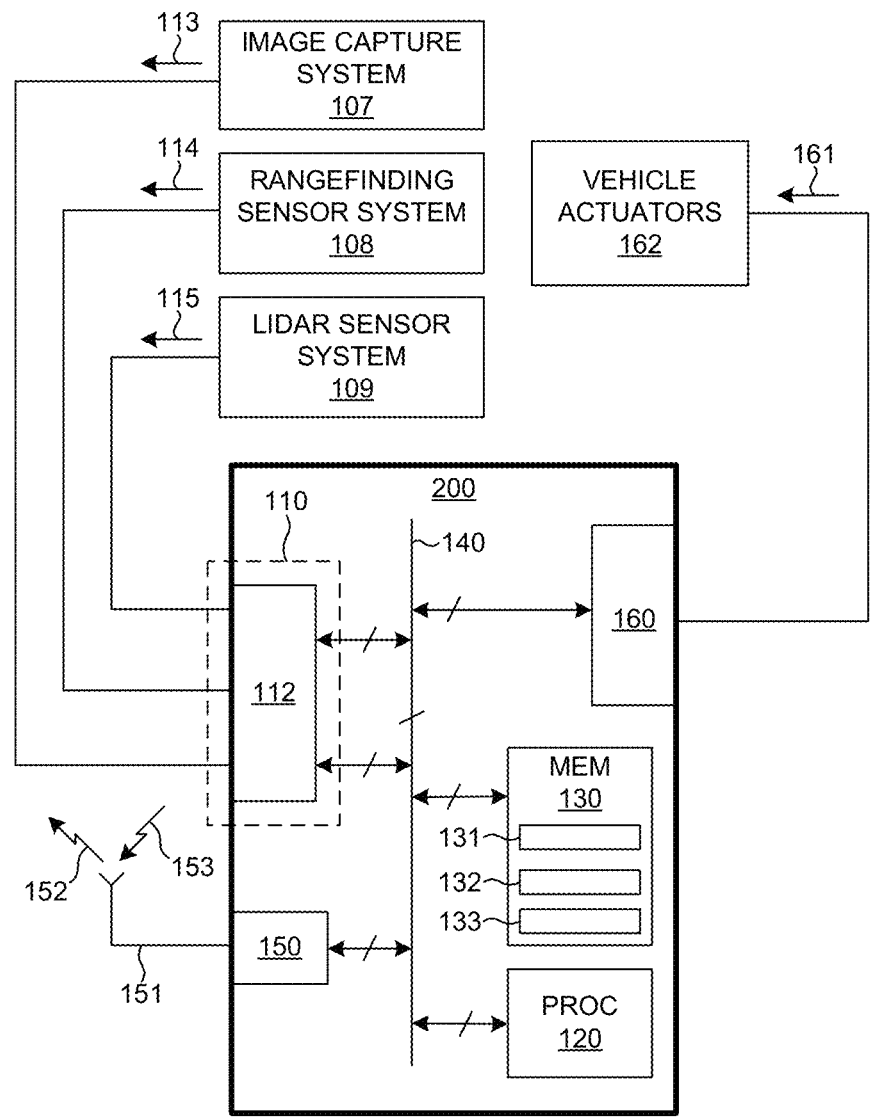
FIG. 3 is a schematic diagram illustrative of elements of mobile robot 100.

FIG. 3 is a diagram illustrative of elements of a mobile robot 100 including computing system 200, image capture system 107, range finding sensor system 108, LIDAR sensor system 109, and vehicle actuators 162. In the embodiment depicted in FIG. 3, computing system 200 is communicatively coupled to image capture system 107, range finding sensor system 108, LIDAR sensor system 109, and vehicle actuators 162 by wired communications links. However, in general, computing system 200 may be communicatively coupled to any of the sensors and devices described herein by either a wired or wireless communication link. In general, any number of sensors to locate mobile robot 100 in a service environment and to identify nearby pedestrians and their respective positions and velocities relative to mobile robot 100 may be communicatively coupled to computing system 200.

As depicted in FIG. 3, computing system 200 includes a sensor interface 110, at least one processor 120, a memory 130, a bus 140, a wireless communication transceiver 150, and a controlled device interface 160. Sensor interface 110, processor 120, memory 130, wireless communication transceiver 150, and controlled device interface 160 are configured to communicate over bus 140.

As depicted in FIG. 3, sensor interface 110 includes a digital input/output interface 112. In some other embodiments, sensor interface 110 includes analog to digital conversion (ADC) electronics (not shown), a wireless communications transceiver (not shown), or a combination thereof, to communicate with a sensor system to receive measurement data from one or more sensors. In general, any of the sensors described herein may be digital or analog sensors, and may be communicatively coupled to computing system 200 by the appropriate interface.

As depicted in FIG. 3, digital interface 112 is configured to receive signals 113 from image capture system 107, signals 114 from range finding sensor system 108, and signals 115 from LIDAR sensor system 109. In this example, image capture system 107 includes on-board electronics to generate digital signals 113 indicative of detected images. Similarly, range finding sensor system 108 includes on-board electronics to generate digital signals 114 indicative of distance measurements performed by range finding system 108, and LIDAR sensor system 109 includes on-board electronics to generate digital signals 115 indicative of distance measurements performed by LIDAR sensor system 109.

Controlled device interface 160 includes appropriate digital to analog conversion (DAC) electronics. In addition, in some embodiments, controlled device interface 160 includes a digital input/output interface. In some other embodiments, controlled device interface 160 includes a wireless communications transceiver configured to communicate with a device, including the transmission of control signals.

As depicted in FIG. 3, controlled device interface 160 is configured to transmit control commands 161 to the vehicle actuators 162 that cause the wheeled, robotic vehicle 101 to move at a desired velocity (i.e., both speed and direction) within the crowded pedestrian environment.

Memory 130 includes an amount of memory 131 that stores measurement data collected from sensors 107-109. Memory 130 also includes an amount of memory 132 that stores program code that, when executed by processor 120, causes processor 120 to implement navigation functionality as described herein.

In some examples, processor 120 is configured to store digital signals generated by sensor interface 110 onto memory 131. In addition, processor 120 is configured to read the digital signals stored on memory 131 and transmit the digital signals to wireless communication transceiver 150. Wireless communications transceiver 150 is configured to communicate the digital signals from computing system 200 to an external computing device (not shown) over a wireless communications link. As depicted in FIG. 3, wireless communications transceiver transmits a radio frequency signal 152 over antenna 151. The radio frequency signal 152 includes digital information indicative of the digital signals to be communicated from computing system 200 to the external computing device. In one example, images collected by image capture device 123 and distances measured by range finding sensor system 108 and LIDAR sensor system 109 are communicated to an external computing system for purposes of monitoring the activities of the mobile robot.

In another example, wireless communications transceiver 150 is configured to communicate digital signals from an external computing device (not shown) to computing system 200 over a wireless communications link. As depicted in FIG. 3, wireless communications transceiver receives a radio frequency signal 153 over antenna 151. In one example, the radio frequency signal 153 includes digital information indicative of the location of mobile robot 100 within the service environment.

In one aspect, a computing system is configured as a navigation engine to navigate mobile robot 100 through a crowded pedestrian environment toward a desired endpoint location by selecting and following a particular pedestrian. In some examples, computing system 200 is configured as a navigation engine. In some other examples, an external computing system is configured as a navigation engine.

Figure 4:
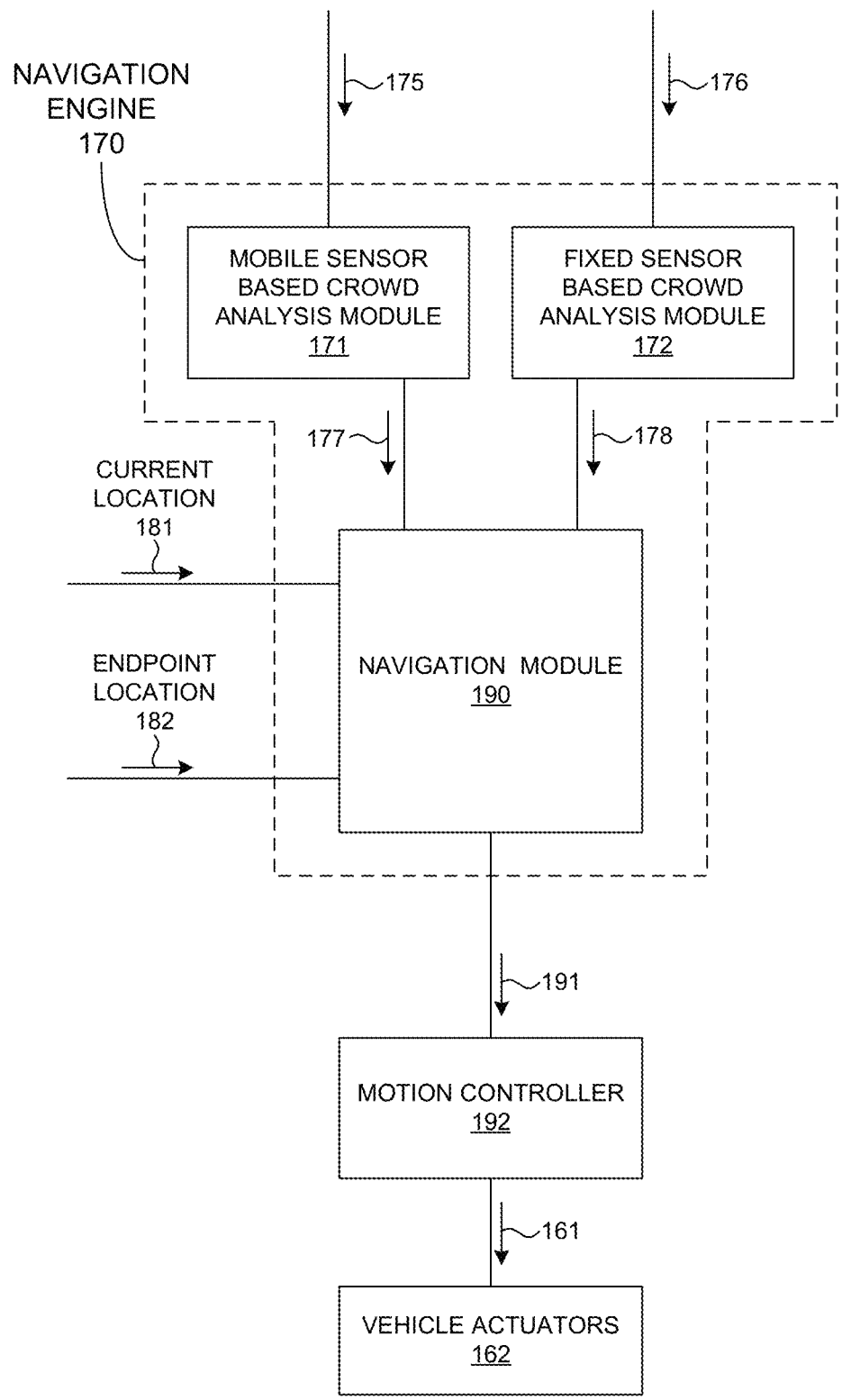
FIG. 4 is a diagram illustrative of an exemplary navigation engine 170 in one embodiment.

FIG. 4 is a diagram illustrative of an exemplary navigation engine 170 in one embodiment. As depicted in FIG. 4, navigation engine 170 includes mobile sensor based crowd analysis module 171, fixed sensor based crowd analysis module 172, and navigation module 190. Mobile sensor based crowd analysis module 171 receives signals 175 generated by sensors attached to mobile robot 100. In this example, signals 175 may include image data collected by image capture system 107, range data collected by range finding sensor system 108, and range data collected by LIDAR sensor system 109.

Mobile sensor based crowd analysis module 171 processes signals 175 to determine the position and velocity 177 of each pedestrian in the vicinity of mobile robot 100. In some examples, mobile sensor based crowd analysis module 171 generates a time sequence of images of nearby pedestrians based on image data, rangefinder data, LIDAR data, or a combination thereof. The position and velocity of each nearby pedestrian relative to the mobile robot is determined from image sequence data at each sampling point in time. Furthermore, the position and velocity of the mobile robot 100 with respect to the crowded pedestrian environment is also measured. Mobile sensor based crowd analysis module 171 determines the position and velocity of each nearby pedestrian with respect to the crowded pedestrian environment based on the position and velocity of each nearby pedestrian relative to the mobile robot and the position and velocity of the mobile robot 100 with respect to the crowded pedestrian environment. In some examples, the position and velocity of the mobile robot 100 is measured by on-board sensors. In one example, dead reckoning sensors on board the mobile robot 100 may be employed to estimate its position and velocity at any given time. In another example, an indoor positioning system may be employed to estimate the position and velocity of the mobile robot at any given time. In some other examples, the position and velocity of the mobile robot is measured based on sensors fixed to the environment.

Figure 5:
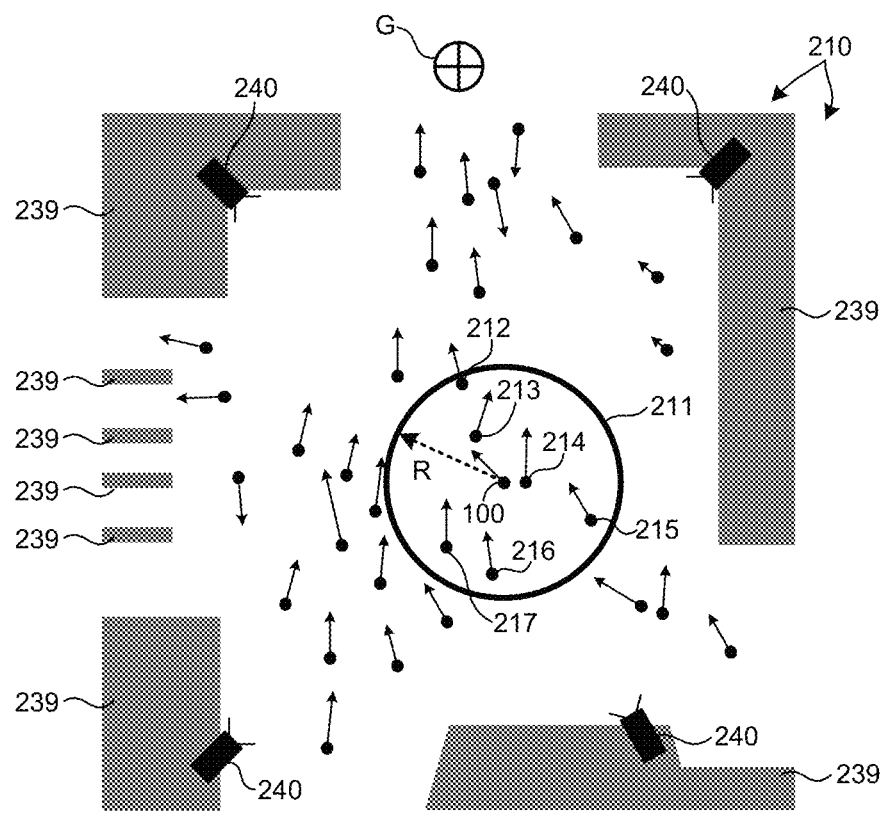
FIG. 5 depicts an illustration of a crowded pedestrian environment 210 including a mobile robot 100 navigating to a destination as described herein.

FIG. 5 depicts an illustration of a crowded pedestrian environment 210 in one instance. The crowded pedestrian environment 210 includes a number of fixed structures 239 (e.g., building walls, turnstiles, etc.) and a number of pedestrians maneuvering through the environment. A mobile robot 100 within environment 210 moves with a particular velocity depicted by the accompanying vector. Similarly, nearby pedestrians 213-216 each move at their own respective velocities indicated by the illustrated vectors. In this example, nearby pedestrians 213-216 are identified as pedestrians within a distance, R, from mobile robot 100 at any given instance.

In one example, mobile sensor based crowd analysis module 171 processes signals 175 to determine the position and velocity 177 of pedestrians 213-216 relative to mobile robot 100 at the instance depicted in FIG. 5 and at each additional sampling point in time.

In general, nearby pedestrians may be identified for purposes of navigation in any suitable manner. In one example, nearby pedestrians may be identified as the N closest pedestrians, where N is any positive integer number. In another example, nearby pedestrians are identified as all pedestrians within a line of sight of the mobile robot.

Fixed sensor based crowd analysis module 172 receives signals 176 generated by sensors attached to fixed structures within the crowded pedestrian environment. For example, one or more cameras 240 are mounted to structures 239 of the crowded pedestrian environment 210 depicted in FIG. 5. The cameras 240 generate image data 176 that is received by fixed sensor based crowd analysis module 172.

In one example, signals 176 include a time sequence of images of crowded pedestrian environment 210. Based on signals 176, fixed sensor based crowd analysis module 172 identifies pedestrian flows between mobile robot 100 and a desired endpoint destination, G, depicted in FIG. 5. In another example, fixed sensor based crowd analysis module 172 processes signals 176 to determine the position and velocity 178 of pedestrians nearby mobile robot 100. In one example, fixed sensor based crowd analysis module 172 identifies nearby pedestrians 213-216 as pedestrians within a distance, R, from mobile robot 100 at any given instance. In addition, fixed sensor based crowd analysis module 172 determines the position and velocity of each nearby pedestrian 213-216 relative to the crowded pedestrian environment 210 based on image sequence data at each sampling point in time.

In general, one or more different types of sensors may be mounted to fixed structures within the crowded pedestrian environment to capture data suitable for estimation of velocities of pedestrians by fixed sensor based crowd analysis module 172. For example, sensors such as cameras, range finders, and LIDAR devices may be employed.

As depicted in FIG. 4, both mobile sensor based crowd analysis module 171 and fixed sensor based crowd analysis module 172 are employed to generate position and velocity information 177 and 178, respectively. This information forms the basis for navigation. However, in general, either mobile sensor based crowd analysis module 171 or fixed sensor based crowd analysis module 172 may be employed exclusively to generate position and velocity information for navigation.

As depicted in FIG. 4, navigation module 190 enables a mobile robot to navigate through a crowded pedestrian environment from one location to another by following selected pedestrians. Navigation module 190 selects a pedestrian to follow and determines a desired velocity 191 of the mobile robot to move behind and follow the selected pedestrian. Navigation model 190 selects the pedestrian and determines the desired velocity of the mobile robot (i.e., speed and steering angle) based on the mobile robots current position 181, desired endpoint location 182, and the positions and velocities of pedestrians in the vicinity of the mobile robot (e.g., indicated by any of position and velocity information 177 and 178). The desired velocity 191 is communicated to a motion controller 192 (e.g., implemented on computing system 200) that generates command signals 161. The command signals 161 are communicated to vehicle actuators 162 of mobile robot 100 to move mobile robot 100 at the desired velocity 191. Velocity information 177 from mobile sensor based crowd analysis module 171 and current position information (e.g., from an indoor positioning system, etc.) are repeatedly sampled, and the desired velocity is repeatedly updated. In this manner, navigation module 190 navigates mobile robot 100 through a crowded pedestrian environment with a minimum of disruption to traffic flow.

Figure 6:
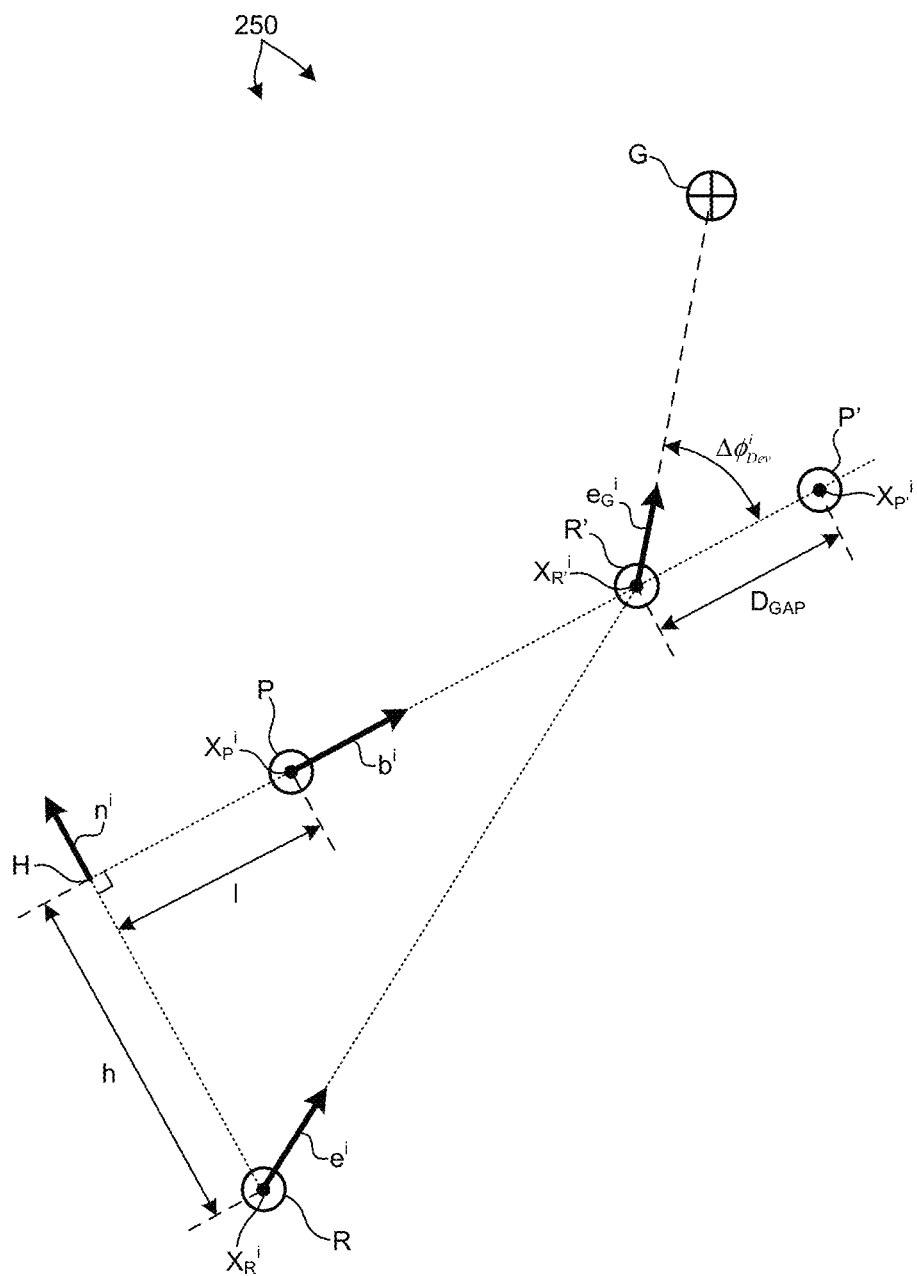
FIG. 6 is a diagram 250 illustrative of the trajectory of a candidate pedestrian, i, and a corresponding candidate trajectory of mobile robot 100 controlled to follow the $i^{th}$ pedestrian.

FIG. 6 is a diagram 250 illustrative of the trajectory of a candidate pedestrian, i, and a corresponding candidate trajectory of mobile robot 100 controlled to follow the $i^{th}$ pedestrian. As depicted in FIG. 6, R is the present location of mobile robot 100 at coordinate $X_R^i$ and P is the present location of the $i^{th}$ pedestrian at coordinate $X_P^i$. R' is the location of mobile robot 100 at coordinate $X_R^i$ after a period of time, $\Delta t^i$, has elapsed. Similarly, P' is the location of the $i^{th}$ pedestrian at coordinate $X_P^i$ after the period of time, $\Delta t^i$, has elapsed. The vector, $b^i$, indicates the trajectory of the $i^{th}$ pedestrian from the present time until the period of time, $\Delta t^i$, has elapsed. The candidate moves in the direction of vector $b^i$ at a speed, $v_P^i$. The vector, $e^i$, indicates the trajectory of mobile robot 100 to intercept the trajectory of the $i^{th}$ pedestrian at the point in time when $\Delta t^i$ has elapsed. The mobile robot 100 moves in the direction of vector $e^i$ at a speed, $v_R^i$. At the point in time when $\Delta t^i$ has elapsed, the trajectory of mobile robot 100 intercepts the trajectory of the candidate pedestrian when the mobile robot is a distance, $D_{Gap}$, behind the candidate pedestrian. At this point in time, mobile robot 100 changes its trajectory, $e^i$, to align with the trajectory, $b^i$, of the candidate pedestrian and follows the candidate pedestrian at the distance, $D_{Gap}$. G is the endpoint location (i.e., desired destination) of mobile robot 100. The vector, $e_G^i$, indicates an ideal trajectory directly from location R' to location G. $\Delta\phi_{Dev}^i$ indicates the angle between the trajectory of the candidate pedestrian indicated by vector $b^i$ and the ideal trajectory indicated by vector $e_G^i$.

During the period of time, $\Delta t^i$, the distances traveled by the $i^{th}$ pedestrian and mobile robot 100 are described by equations (1) and (2), respectively.

$$\overline{PP'}=v_P^i \Delta t^i \quad (1)$$

$$\overline{RR'}=v_R^i \Delta t^i \quad (2)$$

As depicted in FIG. 6, location H is the right angle intercept of the location of mobile robot 100, R, with the trajectory, $b^i$, of the candidate pedestrian at location, P. As indicated in FIG. 6, the vector, $n^i$, indicates the direction normal to the trajectory, $b^i$, of the $i^{th}$ pedestrian at location, P. The distance, l, indicates the distance between mobile robot 100 and the $i^{th}$ pedestrian at the present time in the direction aligned with vector $b^i$. The distance, h, indicates the distance between mobile robot 100 and the $i^{th}$ pedestrian at the present time in the direction aligned with vector $n^i$. The period of time, $\Delta t^i$, can be calculated by applying the Pythagoras formula to right angle triangle $\Delta RHR'$ depicted in FIG. 6 as indicated by equation (3).

$$\overline{HR}^2+\overline{HR'}^2=\overline{RR'}^2 \quad (3)$$

Equation (3) can be rewritten as indicated by equation (4).

$$h^2+(l+v_P^i\Delta t^i D_{gap})^2=v_R^{i2}\Delta t^{i2} \quad (4)$$

Solving equation (4) for $\Delta t^i$ results in equation (5), $$\Delta t^i = \frac{1}{a}\left(-b \pm \sqrt{b^2 - ac}\right) \quad (5)$$

where $a=v_P^{i2}-v_R^{i2}$, $b=1-D_{gap}$, and $c=(1-D_{gap})^2+h^2$. The values of h and l are calculated based on vector dot product equations (6) and (7), respectively.

$$h=n^{iT}(X_P^i-X_R^i) \quad (6)$$

$$l=b^{iT}(X_P^i-X_R^i) \quad (7)$$

The coordinate location, $X_R^{i'}$, at intercept location, R', is determined by equation (8) based on the value of $\Delta t^i$.

$$X_R^{i'}=X_R^i+v_R^i\Delta t^i e^i \quad (8)$$

As illustrated by equations (1)-(8), navigation module 190 estimates the time it will take to intercept the trajectory of a candidate pedestrian (i.e., time to "catch up" to a candidate pedestrian) and the intercept location in the crowded pedestrian environment. Navigation module 190 repeats this estimation for several candidate pedestrians (e.g., pedestrians 213-216 depicted in FIG. 5).

In a further aspect, navigation module 190 selects which candidate pedestrian to follow based on one or more criteria. Exemplary criteria include whether the candidate pedestrian is moving in the same or similar direction as the robot's destination, how long it will take for the mobile robot to "catch up" to the candidate pedestrian, and how quickly the pedestrian is moving compared to the desired speed of the mobile robot.

In one example, navigation module 190 evaluates a cost function for each candidate pedestrian and selects the candidate pedestrian associated with the smallest value of the cost function. An exemplary cost function, J, is illustrated by equation (9), $$J^i=c_1(\Delta t^i)^2+c_2(\Delta \varnothing_{dev}^i)^2+c_3(v_P^i-V_d)^2 \quad (9)$$

where superscript i indicates that the cost function is evaluated with respect to the $i^{th}$ pedestrian, $\Delta t^i$ is the period of time required for the mobile robot to "catch up" to the $i^{th}$ pedestrian, $\phi_{dev}^i$, is the deviation of the trajectory of the $i^{th}$ pedestrian from the direction of the endpoint location, G, of the mobile robot, $V_d$ is the desired speed of the mobile robot, and $c_1$, $c_2$, and $c_3$ are weighting coefficients associated with each term of the cost function.

$\Delta\phi_{Dev}^i$ is estimated by navigation module 190 based on the known unit vectors $b^i$ and $e_G^i$ as indicated by equations (10) and (11).

$$\cos\Delta\phi_{dev}^i = (e_G^i)^T b^i \quad (10)$$

$$\Delta\phi_{dev}^i = \tan^{-1}\left(\sqrt{\frac{1}{[(e_G^i)^T b^i]^2} - 1}\right) \quad (11)$$

In another further aspect, navigation module 190 estimates whether another pedestrian will collide with mobile 100 if the mobile robot proceeds along a trajectory to intercept the trajectory of a candidate pedestrian. If navigation module 190 determines that a collision with another pedestrian will occur if navigation module 190 selects a particular candidate pedestrian to follow, navigation module 190 selects a different candidate pedestrian to follow.

Figure 7:
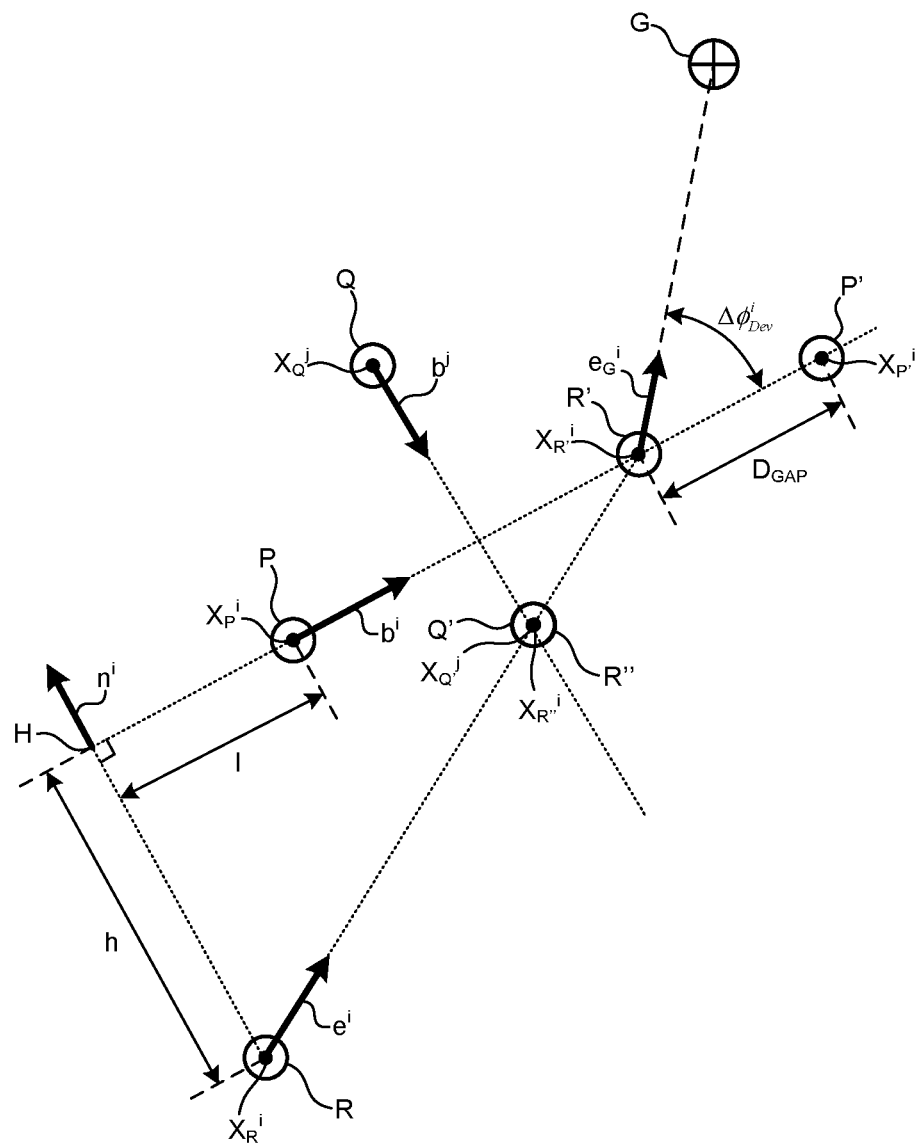
FIG. 7 is a diagram 260 illustrative of the trajectory of another pedestrian, j, that will collide with mobile robot 100 if mobile robot 100 follows a trajectory to intercept the $i^{th}$ pedestrian depicted in FIG. 6.

FIG. 7 is a diagram 260 illustrative of the trajectory of another pedestrian, j, that will collide with mobile robot 100 if mobile robot 100 follows a trajectory to intercept the $i^{th}$ pedestrian depicted in FIG. 6. Common reference labels of FIG. 7 that are described with respect to FIG. 6 are identical. As depicted in FIG. 7, Q is the present location of the $j^{th}$ pedestrian at coordinate $X_Q^j$. Q' is the location of the $j^{th}$ pedestrian at coordinate $X_Q^{'i}$ after a period of time, AO, has elapsed. Similarly, R'' is the location of mobile robot 100 at coordinate $X_{R''}^i$ after the period of time, $\Delta t^j$, has elapsed. The vector, $b^j$, indicates the trajectory of pedestrian, j, from the present time until the period of time, $\Delta t^j$, has elapsed. The $j^{th}$ pedestrian moves in the direction of vector $b_j$ at a speed, $v_Q^j$.

Assuming a collision takes place after the period of time, $\Delta t^j$, the location of mobile robot 100 at the time of collision is estimated by equation (12).

$$X_{R''}^i=X_R^i+v_R^i\Delta t^j e^i \quad (12)$$

The location of pedestrian j after the period of time, $\Delta t^j$, has elapsed is estimated by equation (13).

$$X_{Q'}^j=X_Q^j+v_Q^j\Delta t^j b^j \quad (13)$$

At the point of collision, $X_{R''}^i=X_{Q'}^j$ at time $\Delta t^j$. Thus, equations (12) and (13) can be combined and the time of collision $\Delta t^j$ is isolated as described in equations (14) and (15).

$$(v_R^i e^i - v_Q^j b^j)\Delta t^j = X_Q^j - X_R^i \quad (14)$$

$$\Delta t^j = \frac{X_Q^j - X_R^i}{v_R^i e^i - v_Q^j b^j} = \frac{e^{iT}(X_Q^j - X_R^i)}{v_R^i - v_Q^j e^{iT} b^j} \quad (15)$$

In this example, navigation module 190 determines if the time of collision with the $j^{th}$ pedestrian occurs before the time of interception of the $i^{th}$ pedestrian (i.e., $0 \leq \Delta t^j \leq \Delta t^i$). If so, then there is a risk of collision with the $j^{th}$ pedestrian, and navigation module 190 determines not to follow the $i^{th}$ pedestrian.

Figure 8:
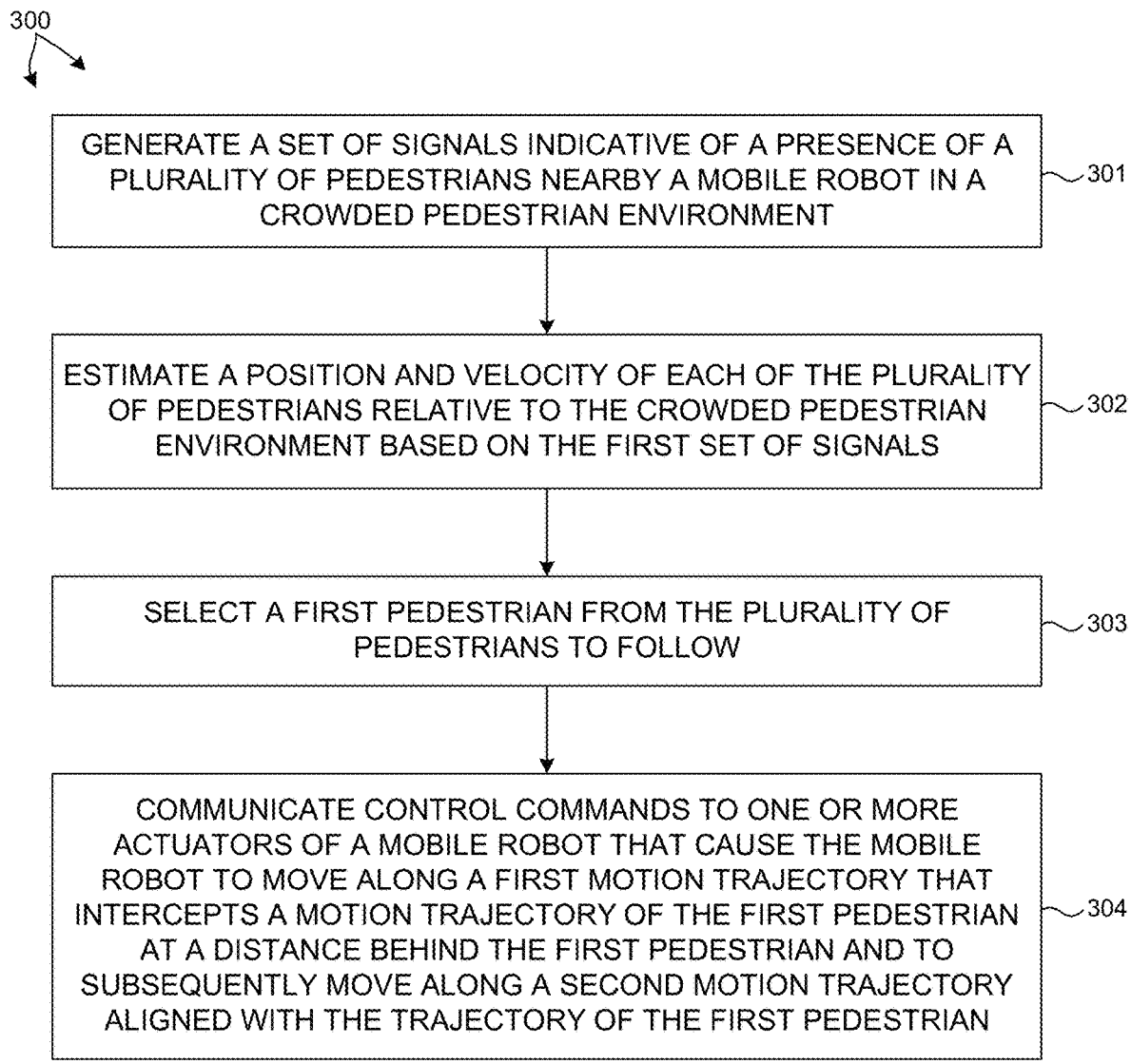
FIG. 8 illustrates a flowchart of a method 300 for navigating a mobile robot through a crowded pedestrian environment by following a pedestrian as described herein.

FIG. 8 illustrates a flowchart of a method 300 suitable for implementation by a mobile robot as described herein. In some embodiments, mobile robot 100 is operable in accordance with method 300 illustrated in FIG. 8. However, in general, the execution of method 300 is not limited to the embodiments of mobile robot 100 described with reference to FIG. 1-4. These illustrations and corresponding explanation are provided by way of example as many other embodiments and operational examples may be contemplated.

In block 301, a set of signals indicative of a presence of a plurality of pedestrians nearby a mobile robot in a crowded pedestrian environment is generated, for example, by sensors on-board mobile robot 100, sensors fixed to the surrounding environment, or a combination thereof.

In block 302, a position and velocity of each of the plurality of pedestrians is estimated relative to the crowded pedestrian environment based on the first set of signals.

In block 303, a first pedestrian is selected from the plurality of pedestrians to follow.

In block 304, control commands are communicated to one or more actuators of a mobile robot that cause the mobile robot to move along a first motion trajectory. The first motion trajectory intercepts a motion trajectory of the first pedestrian at a distance behind the first pedestrian. Subsequently, the control commands cause the mobile robot to move along a second motion trajectory aligned with the trajectory of the first pedestrian.

Computing system 200 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 132 implementing methods such as those described herein may be transmitted over a transmission medium such as a wire, cable, or wireless transmission link. For example, as illustrated in FIG. 2, program instructions 132 stored in memory 130 are transmitted to processor 120 over bus 140. Program instructions 132 are stored in a computer readable medium (e.g., memory 130). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
  a mobile robot including one or more actuators that cause the mobile robot to move in a crowded pedestrian environment;
  one or more sensor systems disposed on the mobile robot that generate a first set of signals indicative of a presence of a plurality of pedestrians nearby the mobile robot; and
  a computing system configured to:
    estimate a position and velocity of each of the plurality of pedestrians relative to the crowded pedestrian environment based on the first set of signals;
    select a first pedestrian from the plurality of pedestrians to follow based on a location of the mobile robot within the crowded pedestrian environment, the position and velocity of each of the plurality of pedestrians, and a desired endpoint location of the mobile robot within the crowded pedestrian environment; and
    communicate control commands to the one or more actuators of the mobile robot that cause the mobile robot to move along a first motion trajectory that intercepts a motion trajectory of the first pedestrian at a distance behind the first pedestrian and to subsequently move along a second motion trajectory aligned with the trajectory of the first pedestrian.

2. The system of claim 1, wherein the selecting of the first pedestrian from the plurality of pedestrians is based a value of a cost function associated with each of the plurality of pedestrians.

3. The system of claim 2, wherein the cost function includes a difference between a direction of a trajectory of a candidate pedestrian and a direction between the desired endpoint location and a location at an intersection of the trajectory of the candidate pedestrian and a corresponding trajectory of the mobile robot.

4. The system of claim 2, wherein the cost function includes a time required for the mobile robot to intersect a trajectory of a candidate pedestrian.

5. The system of claim 2, wherein the cost function includes a difference between a velocity of the mobile robot and a velocity of a candidate pedestrian.

6. The system of claim 1, wherein the computing system is further configured to determine whether the mobile robot moving along the first motion trajectory will collide with a second pedestrian moving along a third motion trajectory.

7. The system of claim 1, wherein the computing system is further configured to select a second pedestrian to follow after the first pedestrian.

8. The system of claim 1, further comprising:
  one or more sensor systems fixed to one or more locations in the crowded pedestrian environment, wherein the position and velocity of each of the plurality of pedestrians relative to the crowded pedestrian environment are periodically measured by the one or more sensor systems fixed to the one or more locations.

9. The system of claim 1, wherein the one or more sensor systems includes any of an image capture system, a range finding sensor system, and a LIDAR sensor system.

10. A system comprising:
a mobile robot including one or more actuators that cause the mobile robot to move in a crowded pedestrian environment;
one or more sensor systems disposed on the mobile robot that generate a first set of signals indicative of a presence of a plurality of pedestrians nearby the mobile robot; and
a non-transitory, computer-readable medium comprising instructions that when executed by a computing system cause the computing system to:
estimate a position and velocity of each of the plurality of pedestrians relative to the crowded pedestrian environment based on the first set of signals;
select a first pedestrian from the plurality of pedestrians to follow based on a location of the mobile robot within the crowded pedestrian environment, the position and velocity of each of the plurality of pedestrians, and a desired endpoint location of the mobile robot within the crowded pedestrian environment; and
communicate control commands to the one or more actuators of the mobile robot that cause the mobile robot to move along a first motion trajectory that intercepts a motion trajectory of the first pedestrian at a distance behind the first pedestrian and to subsequently move along a second motion trajectory aligned with the trajectory of the first pedestrian.

11. The system of claim 10, wherein the selecting of the first pedestrian from the plurality of pedestrians is based a value of a cost function associated with each of the plurality of pedestrians.

12. The system of claim 11, wherein the cost function includes any of:
a difference between a direction of a trajectory of a candidate pedestrian and a direction between the desired endpoint location and a location at an intersection of the trajectory of the candidate pedestrian and a corresponding trajectory of the mobile robot,
a time required for the mobile robot to intersect the trajectory of the candidate pedestrian, and
a difference between a velocity of the mobile robot and a velocity of the candidate pedestrian.

13. The system of claim 10, the non-transitory, computer-readable medium further comprising instructions that when executed by the computing system cause the computing system to:
determine whether the mobile robot moving along the first motion trajectory will collide with a second pedestrian moving along a third motion trajectory.

14. The system of claim 10, the non-transitory, computer-readable medium further comprising instructions that when executed by the computing system cause the computing system to:
select a second pedestrian to follow after the first pedestrian.

15. A method comprising:
generating a set of signals indicative of a presence of a plurality of pedestrians nearby a mobile robot in a crowded pedestrian environment;
estimating a position and velocity of each of the plurality of pedestrians relative to the crowded pedestrian environment based on the set of signals;
selecting a first pedestrian from the plurality of pedestrians to follow based on a location of the mobile robot within the crowded pedestrian environment, the position and velocity of each of the plurality of pedestrians, and a desired endpoint location of the mobile robot within the crowded pedestrian environment;
communicating control commands to one or more actuators of a mobile robot that cause the mobile robot to move along a first motion trajectory that intercepts a motion trajectory of the first pedestrian at a distance behind the first pedestrian and to subsequently move along a second motion trajectory aligned with the trajectory of the first pedestrian.

16. The method of claim 15, wherein the selecting of the first pedestrian from the plurality of pedestrians is based a value of a cost function associated with each of the plurality of pedestrians.

17. The method of claim 16, wherein the cost function includes any of:
a difference between a direction of a trajectory of a candidate pedestrian and a direction between the desired endpoint location and a location at an intersection of the trajectory of the candidate pedestrian and a corresponding trajectory of the mobile robot,
a time required for the mobile robot to intersect the trajectory of the candidate pedestrian, and
a difference between a velocity of the mobile robot and a velocity of the candidate pedestrian.

18. The method of claim 15, further comprising:
determining whether the mobile robot moving along the first motion trajectory will collide with a second pedestrian moving along a third motion trajectory.

19. The method of claim 15, further comprising:
selecting a second pedestrian to follow after the first pedestrian.

* * * * *